United States Patent [19]

Rogers et al.

[11] Patent Number: 5,323,018
[45] Date of Patent: Jun. 21, 1994

[54] STORAGE PHOSPHUR SIZE COMPENSATION SYSTEM

[75] Inventors: Michael K. Rogers, Mendon; Sreeram Dhurjaty, Rochester, both of N.Y.

[73] Assignee: Eastman Kodak Company, Rochester, N.Y.

[21] Appl. No.: 979,970

[22] Filed: Nov. 23, 1992

[51] Int. Cl.$^5$ .................................... G01N 23/04
[52] U.S. Cl. ...................... 250/585; 356/444; 250/586
[58] Field of Search ............... 358/449; 250/327.2 D, 250/327.2 E, 327.2 F, 327.2 G, 327.2 L, 584–587; 356/444

[56] References Cited

U.S. PATENT DOCUMENTS

| Re. 31,847 | 3/1985 | Luckey | 250/327.2 |
|---|---|---|---|
| 4,272,780 | 6/1981 | Belmares-Sarabia et al. | 358/54 |
| 4,568,973 | 2/1986 | Ishida | 358/111 |
| 4,812,879 | 3/1989 | Suzuki | 355/38 |
| 5,151,592 | 9/1992 | Boutet et al. | 250/327.2 |

*Primary Examiner*—Carolyn E. Fields
*Attorney, Agent, or Firm*—William F. Noval

[57] ABSTRACT

Laser imaging apparatus includes a laser which produces a laser beam. An image media is scanned with a laser beam in a raster pattern to produce a scanned image. A photodetector converts the scanned image into an image signal. An amplifier amplifies the image signal and has varying gain. A control circuit controls the laser beam scanning device to scan image media of different sizes with laser beam raster patterns of different sizes. The control circuit includes detectors for detecting the size of the image media. The control circuit varies the gain of the amplifier as a function of the detected size of the scanned image media.

6 Claims, 4 Drawing Sheets

STORAGE PHOSPHUR SIZE COMPENSATION SYSTEM

FIELD OF THE INVENTION

This invention relates in general to laser imaging systems and more particularly to storage phosphor systems in which a latent x-ray image is recorded in a storage phosphor. A storage phosphor reader converts the stored latent x-ray image into an x-ray image signal. The x-ray image signal is compensated for different patterns used to scan different storage phosphor sizes.

BACKGROUND OF THE INVENTION

In a storage phosphor imaging system as described in U.S. Pat. No. 31,847, reissued Mar. 12, 1985, to Luckey, a storage phosphor, also known as a stimulable phosphor, is exposed to an x-ray image of an object, such as the body part of a patient, to record a latent x-ray image in the storage phosphor. The latent x-ray image is read out by stimulating the storage phosphor with relatively long wavelength stimulating radiation such as red or infrared light produced by a helium neon gas laser or diode laser. Upon stimulation, the storage phosphor releases emitted radiation of an intermediate wavelength, such as blue light, in proportion to the quantity of x-rays that were received. To produce a signal useful in electronic image processing the storage phosphor is scanned in a raster pattern by a laser beam deflected by an oscillating or rotating scanning mirror or hologon. The emitted radiation form the storage phosphor is reflected by a mirror light collector and detected by a photodetector such as a photomultiplier to produce an electronic image signal. Typically the storage phosphor is translated in a page scan direction past the laser beam which is repeatedly deflected in a line scan direction perpendicular to the page scan motion of the storage phosphor to form a scanning raster pattern of a matrix of pixels.

Where different size storage phosphors are scanned the scanning raster pattern size can be changed so that the scanning pixel size changes. This results in less stimulating light reaching the storage phosphor and consequent less emitted light to be detected as pixel size decreases. U.S. Pat. No. 4,568,973, issued Feb. 4, 1986, inventor Ishida, discloses a radiation image reproducing system in which the size of the stimulable phosphor sheet is detected, the scanning line density of the stimulating ray and the reproduction scaling factor are changed according to the storage phosphor sheet size to reproduce an image of approximately equal size and resolution on a recording media of a fixed size. The problem of changing levels of emitted light as pixel size changes is not addressed in this patent.

There is thus a problem in the prior art of compensating for different light emission levels produced by changing scanning pixel size for different size storage phosphors.

SUMMARY OF THE INVENTION

According to the present invention there is provided a solution to this problem in the prior art of compensating for different light emitting levels produced by changing the scanning pixel size for different storage phosphor sizes. The laser imaging apparatus of the present invention comprises:

a laser for producing a laser beam;

means for scanning an image media with said laser beam in a raster pattern to produce a scanned image;

photodetector means for converting said scanned image into an image signal;

amplifier means for amplifying said image signal, said amplifier means having varying gain;

control means for controlling said laser beam scanning means to scan image media of different sizes with laser beam raster patterns of different sizes, wherein said control means includes means for detecting the size of said image media and for varying said gain of said amplifier means as a function of said image media size.

Preferably, the laser imaging apparatus is a storage phosphor reader which converts a latent x-ray image in a storage phosphor into an x-ray image signal. Means are provided for detecting the size of the storage phosphor and for compensating the x-ray image signal as a function of the detected storage phosphor size.

DESCRIPTION OF THE PREFERRED EMBODIMENTS

Although the storage phosphor size compensation apparatus of the present invention will be described in detail hereinafter as incorporated in a storage phosphor laser imaging system such as a storage phosphor reader, it will be understood that the present invention is more broadly applicable to other types of laser imaging systems which require compensation for scanning different sized image media.

Figure 1:
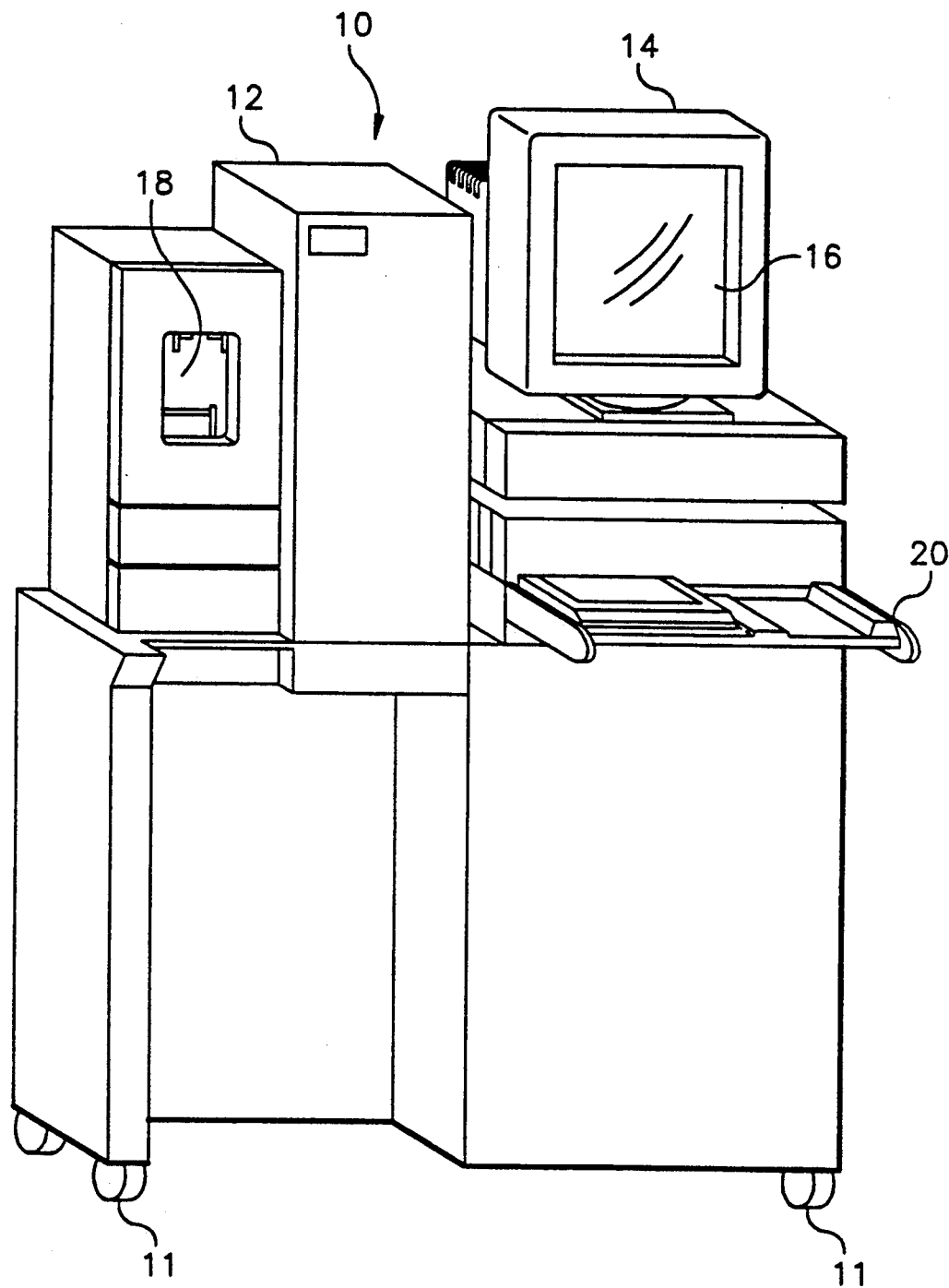
FIG. 1 is a perspective view of a storage phosphor reader incorporating the present invention.

Referring now to FIG. 1, there is shown a storage phosphor reader 10 incorporating an embodiment of the present invention. Reader 10 is mounted on casters 12 for easy portability in a radiology environment. Reader 10 includes a multiunit housing 12 housing the components of storage phosphor reader 10 and a video monitor 14 having a touch screen 16 supported on housing 12. Housing 12 also includes a bar code reader docking station 18 for docking a hand held bar code reader and for transferring data from the hand held bar code reader to storage phosphor reader 10. Reader 10 includes storage phosphor cassette load platform 20 which receives cassettes containing storage phosphor plates which are to be read or erased by reader 10.

In general, storage phosphor reader 10 processes images captured on a storage phosphor plate using conventional radiographic equipment. Reader 10 then scans the storage phosphor plate and converts the latent x-ray image therein into an electrical x-ray image signal which can be viewed on monitor 14. The scanned image is then delivered to a receiving device (such as a quality control station, laser printer or archival device) for image processing, image enhancement, viewing, printing and/or storage. The storage phosphor reader 10 is operated using touch screen 16 which also displays the image. The storage phosphor plates which are used to hold the unexposed x-ray images are mounted in standard size x-ray cassettes of different sizes. These storage phosphor plates can be erased and reused repeatedly. The optional hand held bar code reader can be used to collect exam information which is transferred to the storage phosphor reader 10 and associated with the scanned images when it is mounted in download station 18.

In general, the storage phosphor reader is usable in the storage phosphor patient identification system disclosed in commonly assigned U.S. patent application Ser. No. 07/963,036, filed Oct. 19, 1992, inventor Good et al. As disclosed in that patent application, the storage phosphor patient identification system is as follows:

When a radiology technologist receives a request for an x-ray examination of a patient, the technologist exposes a body part of the patient to an x-ray which is stored as a latent x-ray image in the storage phosphor plate of a storage phosphor cassette. Several images may be taken at this time. Using the optional portable bar code reader the technologist scans the patient identification bar code label and the label on the storage phosphor cassette. Exam related information can be scanned from a bar code chart that is usually attached to the portable x-ray generator. Such information includes body part type, x-ray exposure conditions, position of patient and the like.

The image is now captured by the technologist performing the x-ray exam using the cassette containing the storage phosphor plate from which the bar code label was scanned. When the x-ray exam is complete the technologist takes the storage phosphor cassette to storage phosphor reader 10 to be processed. If the optional bar code reader is used, the technologist transfers the patient identification and exam information by inserting the bar code reader into the bar code reader station 18 on the front of reader 10. The scanned information is then transferred to the control system of the storage phosphor reader 10. The technologist then loads the cassette containing the exposed storage phosphor plate into reader 10 by loading on load platform 20. Scanning is initiated when the technologist presses a start button on touch screen 16.

Inside storage phosphor reader 10 the storage phosphor plate is extracted from the cassette and scanned with a laser light. As the plate is scanned, the image appears on touch screen 16 as it is being scanned. After the scanning is complete the image is sent to a receiving device where it can be tonescaled, enhanced, viewed, printed and/or stored. After the storage phosphor plate has been completely scanned it is erased by exposure to light which removes any remnants of the image. The storage phosphor reader 10 then places the storage phosphor plate back into its cassette. The technologist can now remove the cassette from reader 10 to be reused for another exam.

Figure 2:
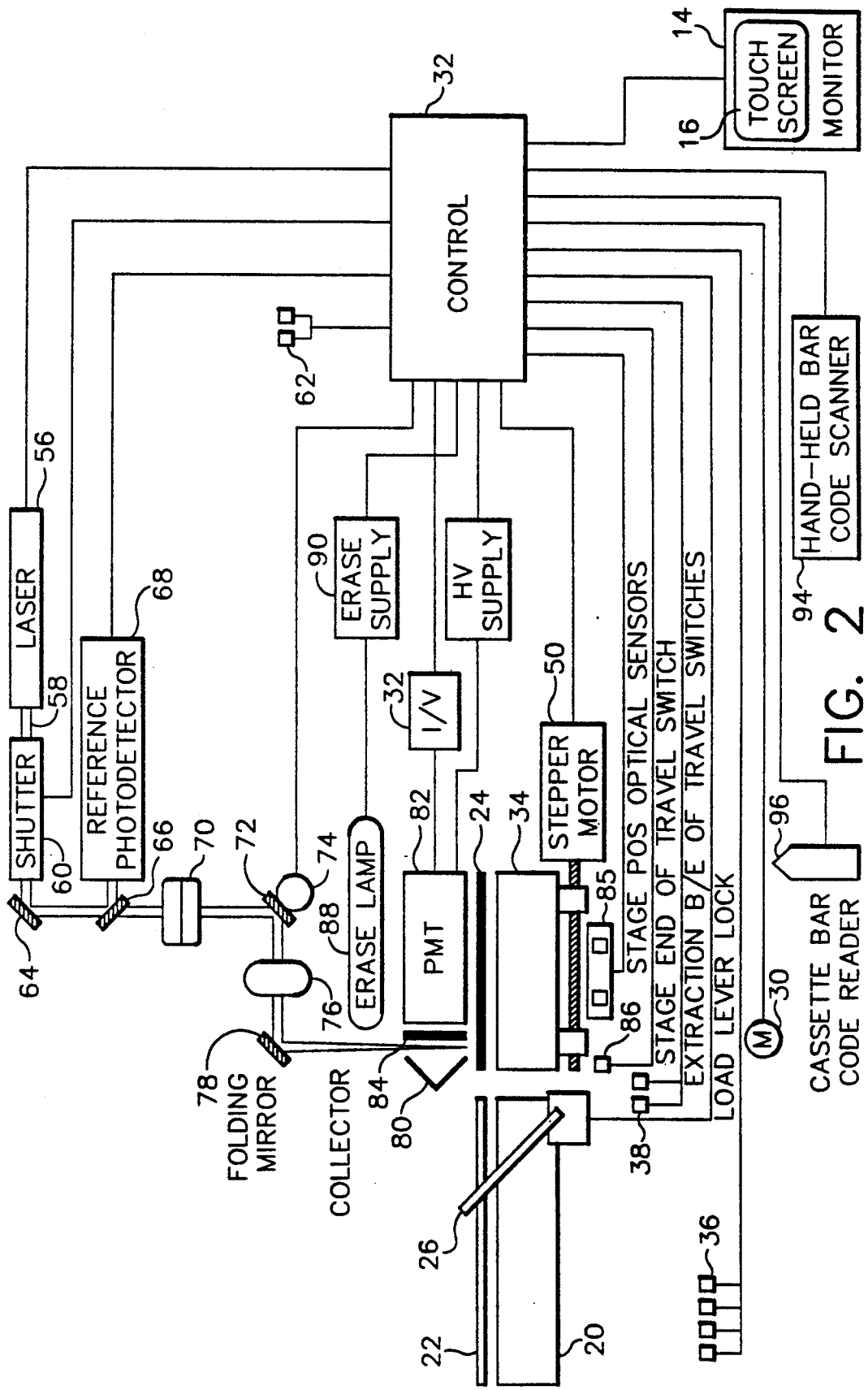
FIGS. 2 and 3 are respectively a partially diagrammatic, partially schematic view and a perspective view of the components of the storage phosphor reader of FIG. 1.
Figure 3:
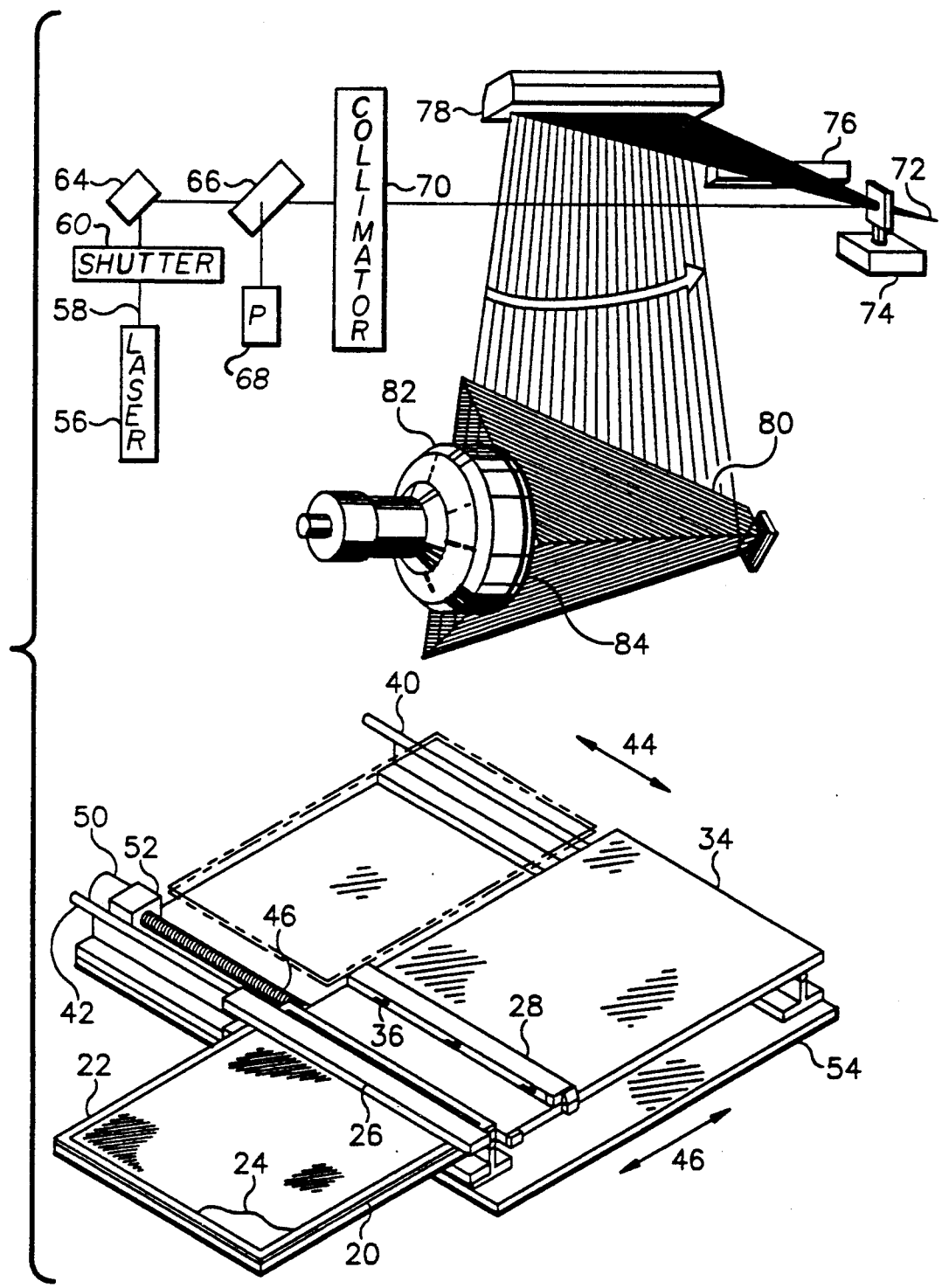

Referring now to FIGS. 2 and 3 there will be described in greater detail a preferred embodiment of storage phosphor reader 10 incorporating the present invention. As shown, a storage phosphor cassette 22 containing a storage phosphor plate 24 is loaded on cassette load platform 20. Load lever 26 is rotated to clamp cassette 22 in place and unlatches the cassette 22 to permit extraction of storage phosphor plate 24 therefrom. Storage phosphor plate 24 is extracted from cassette 22 by extraction device 28 (FIG. 3) which is actuated by extraction motor 30 under software control from control 32. Control 32 includes standard computer components such as a microprocessor, a magnetic disk drive for storing images, software applications and computer operating system and input and output devices to communicate with the components of reader 10. Such microcomputer systems are well known in the art and will not be described in detail herein.

Extraction device 28 is slidably mounted on translation stage 34 and includes hooks 36 which engage storage phosphor plate 24. Extraction device 28 extracts storage phosphor plate 24 from cassette 22 onto translation stage 34. As the storage phosphor plate 22 is loaded onto stage 34 it passes over plate size detecting switches 36 which detect the plate size and communicate this information to control 32 (as will be described in greater detail later). There are sufficient plate size detectors 36 to detect the different plate sizes that can be processed by reader 10. The beginning and end of travel of extraction mechanism 28 are sensed by extraction begin and end travel switches 38 connected to control 32.

Translation stage 34 is slidably mounted on rails 40 and 42 for movement in opposite directions 44 which are perpendicular to the directions 46 of loading and unloading of plate 24 relative to translation stage 34. Translation stage 34 is driven by a screw drive mechanism 48 actuated by stepper motor 50 mounted on block 52. Rails 40 and 42 are supported by frame member 54 of reader 10.

The laser scanning components will now be described. Reader 10 includes a laser 56 (such as a helium neon gas laser) for stimulation of storage phosphor plate 24. Laser 56 produces a laser beam 58 which passes through a shutter 60. Shutter 60 is controlled by digital signals received from control 32. Shutter 60 closes with activation of cover interlock switches 62 which detect closure of the housing 12 covers.

Beam 58 is reflected off mirror 64 and passes through beam splitter 66 which directs a portion of the laser beam 58 to reference photodetector D 68. Following the beam splitter 66 laser beam 58 passes through collimator 70. The collimated laser beam is deflected by an oscillating scan mirror 72 driven by galvanometer 74 under the control of control 32. Scan mirror 72 provides the line scan raster motion of the laser beam 58. Galvanometer 74 drives mirror 72 with a constant angular velocity.

An f-theta lens 76 produces a flat field of focus and constant linear velocity at the plane of storage phosphor plate 24. Folding mirror 78 directs the laser beam through light collector 80 onto storage phosphor plate 24. Collector 80 may be of the type disclosed in commonly assigned U.S. Pat. No. 5,151,592, issued Sep. 29, 1992, inventors Boutet et al. The stimulating light of laser beam 58 causes the storage phosphor in plate 24 to emit light (blue) which is a function of the x-ray image stored in plate 24. Collector 80 directs this emitted light onto photomultiplier tube (PMT) 82. A filter 84 in front of the face of PMT 82 blocks the scattered stimulating laser light and passes the light emitted by storage phosphor plate 24. Once a storage phosphor plate 24 is on translation stage 34 a scan is begun. Movement of translation stage 34 in the direction of arrow 44 is under software control of control 32. Control 32 sends commands to stepper motor 50 to initiate a scan, to start translation stage 34, to start galvanometer 74 and to turn on PMT 82. From the home position of stage 34 the control 32 counts stepper motor 50 steps to the point where the storage phosphor plate 24 is under collector 80. At this point acquisition of the latent x-ray image on storage phosphor plate 24 begins. At the end of the scan (determined by the number of scan lines for the appropriate storage phosphor plate size), PMT 82 and galvanometer 74 are turned off and translation stage 34 is returned to the home position which is determined by one of the stage position optical sensors 85. A stage end of travel switch 86 is located just beyond the position of optical sensors 84 to prevent damage in case of failure of optical sensors 84.

Immediately after translation stage 34 reaches the home position, erase lamp 88 is turned on by actuation of erase power supply 90 under software control from control 32. Following a predetermined erase time (such as 30 seconds) erase lamp 88 is turned off and extraction mechanism 28 returns storage phosphor plate 24 in the direction of arrow 46 to storage phosphor cassette 22. When the extraction mechanism 28 trips the extraction end of travel switch 38, the lock for load lever 26 is released. The storage phosphor reader user can now rotate load lever 26 and remove cassette 22 from loading platform 20.

During the scan of storage phosphor plate 24 an emitted x-ray light image is converted by PMT 82 into an x-ray electrical current signal. This signal is converted to a voltage by amplifier 92. As described in greater detail in commonly assigned U.S. Pat. No. 5,260,561, issued Nov. 9, 1993, inventor S. Dhurjaty, entitled "Laser Noise Correction System", laser noise which is present in the x-ray image signal produced by PMT 82 is corrected by subtracting a reference signal detected by reference photodetector 68. The corrected digital signal is corrected for the light collection signature of light collector 80 by a correction lookup table in control 32. The correction lookup table is loaded during calibration of reader 10 when it is initially set up.

Patient identification and examination information are downloaded into reader 10 from a hand held bar code scanner 94 positioned in station 18 of reader 10. As each storage phosphor plate 24 is extracted from its cassette 22 cassette bar code reader 96 reads the bar code on plate 24. The image data and corresponding patient and exam information are correlated by control 32.

The physical size of the cassettes 22 containing the storage phosphor plates 24 are identical to that of conventional radiographic film/screen cassette sizes. Typically storage phosphor reader 10 is capable of reading the following storage phosphor plate sizes: 18×24 centimeters, 24×30 centimeters, 35×35 centimeters, and 35×43 centimeters. The raster pattern or matrix pixel size for each storage phosphor plate that can be processed is, for example, as follows: 18×24 cm-1792×2400; 24×34 cm-2048×2500; 35×35 cm-204×2048; and 35×43 cm-2048×2500. It can be seen that as the storage phosphor plate decreases in size, the pixel size of the stimulating laser beam decreases in size. However, the decrease in laser beam stimulating area produces an emitted light image which also decreases in intensity. According to the present invention, in order to compensate for the decrease in emitted light level with a decrease in storage phosphor plate size, means are provided for detecting the size of the storage phosphor plate and changing the gain of amplification of the detected image x-ray signal as a function of the detected storage phosphor plate size.

Figure 4:
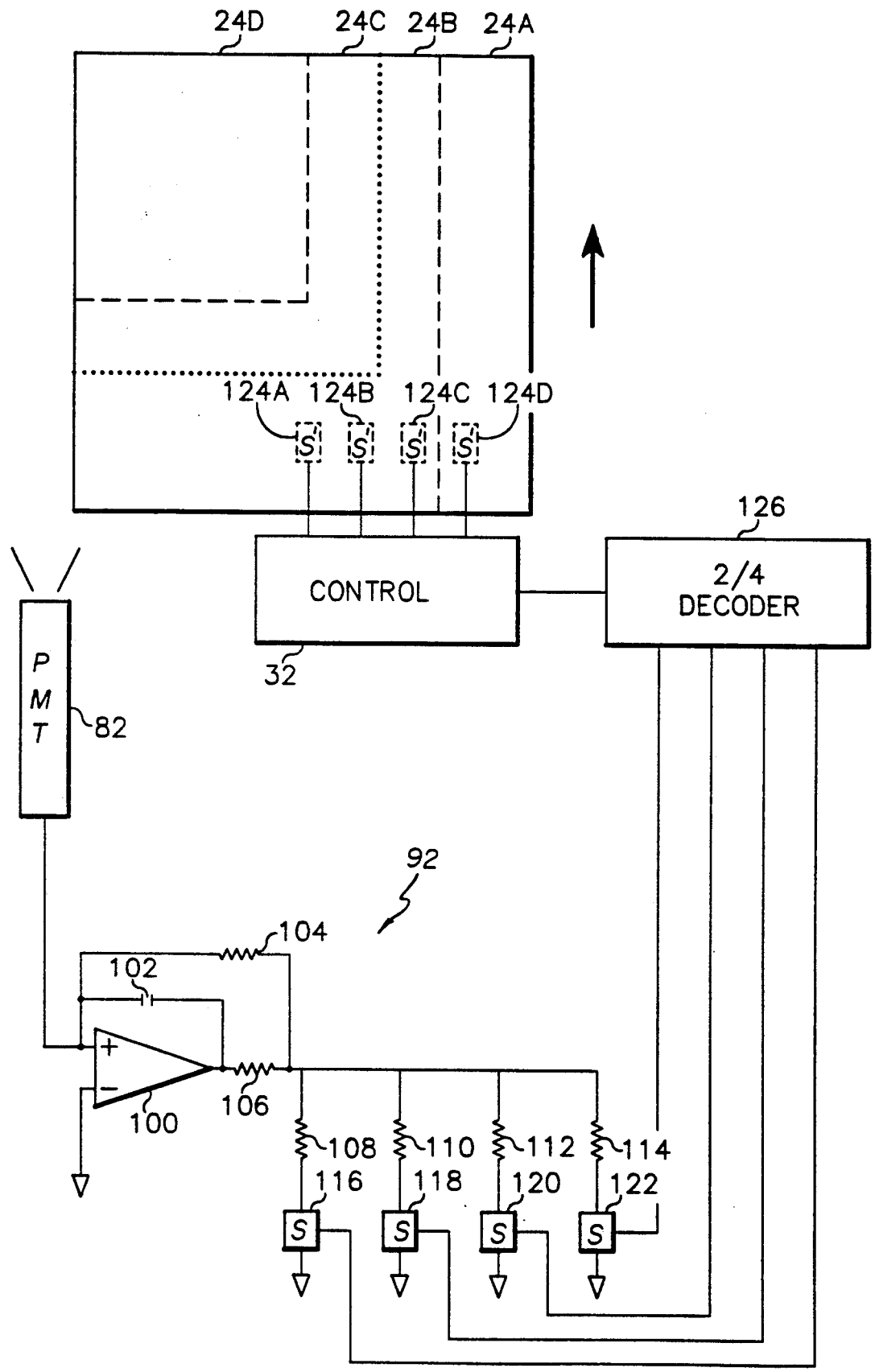
FIG. 4 is a schematic diagram of the storage phosphor size compensation apparatus of the present invention.

Referring now to FIG. 4, there is shown an embodiment of the compensation apparatus of the present invention. As shown, a photomultiplier tube 82 converts the emitted light x-ray image into an electrical current x-ray image signal which is amplified by current to voltage amplifier 92. Amplifier 92 includes operational amplifier 100 whose non-inverting input is connected to ground and having a network including capacitor 102 and resistors 104 and 106, connected between the inverting input and output of operational amplifier 100. The gain of operational amplifier 100 is varied by selectively connecting one of resistors 108, 110, 112 or 114 to ground by means of respective switches S 116, 118, 120 and 122. The selection of the appropriate gain resistor 108–114 is a function of detection of the size of storage phosphor plate 24. As explained above, storage phosphor plate 24 can typically have one of four sizes as depicted by plates 24a, 24b, 24c and 24d (which depict progressively smaller phosphor plates). A plurality of storage phosphor plate detecting switches 124a, 124b, 124c and 124d are associated with translation stage 34. As a plate 24 is loaded onto stage 34, one or more of size detection switches S 24a–124d will be actuated to send size detection signals to control 32. Control 32 sends a two bit digital control signal to 2/4 decoder 126 which decodes the digital signals into a control signal to control one of switches 116–122.

As an example, if all four detection switches 124a–124d are actuated, it is an indication that the largest storage phosphor plate 24a is detected. Control 32, through decoder 126, sends a control signal to switch 122 to place resistor 114 in the circuit of operational amplifier 100 to set the gain of amplifier 92 at a gain A. On the other hand, if only detection switch 124d is actuated, indicating that the smallest storage phosphor plate 24d is to be processed by reader 10, control 32 sends a control signal, through decoder 126, to switch 116 to place resistor 108 in the gain circuit of operational amplifier 100. In such case, the gain of amplifier 92 may be 2A to compensate for the decrease in emission signal level resulting from the high resolution scan of a smaller storage phosphor plate. The gains for amplifier 92 resulting from detection of storage phosphor plates of the sizes 24b or 24c would be between gains A to 2A.

Although the invention has been described and illustrated above with respect to storage phosphor imaging systems, it will be understood that the compensation apparatus of the present invention is also applicable to other imaging systems in which an imaging media of different media sizes is raster scanned to produce an image signal. For example, the invention is applicable to film digitizers, in which x-ray films of different sizes are scanned by means of a scanning laser beam which is adjusted in size when smaller x-ray films are scanned in order to maintain image resolution. In such case, the x-ray film image size is detected and the scanned image signal amplified accordingly in order to produce an x-ray image signal which is substantially constant for different film image sizes.

The present invention finds application in laser imaging systems and particularly in medical diagnostic imaging systems, such as storage phosphor laser imaging systems.

Although the invention has been described with reference to preferred embodiments thereof, it will be understood that variations and modifications can be effected within the spirit and scope of the invention as described above and as defined in the appended claims.

What is claimed is:
1. Laser imaging apparatus comprising:
a laser for producing a laser beam;

means for scanning an image media with said laser beam in a raster pattern to produce a scanned image;

photodetector means for converting said scanned image into an image signal;

amplifier means for amplifying said image signal, wherein said amplifier means has a varying gain; and control means for controlling said laser beam scanning means to scan image media of different sizes with laser beam raster patterns of different sizes wherein said control means includes means for detecting the size of said image media and for varying said gain of said amplifier means as a function of said image media size.

2. The laser imaging apparatus of claim 1 wherein said scanning means includes mirror means for scanning said laser beam in a line scan direction across the width of said image media and means for moving said image media in a page scan direction past said scanning laser beam; and including means for feeding an image media to and from said moving means and wherein said detecting means detects the size of said image media as it is fed to said moving means.

3. The laser imaging apparatus of claim 1 wherein said amplifier means includes an operational amplifier having a plurality of selectable gain setting resistors only one of which is operable to set amplifier gain at a time and wherein said control means selects one of said plurality of gain setting resistors as a function of the size of said image media detected by said detecting means.

4. Storage phosphor reader apparatus, comprising:
a laser for producing a laser beam;

means for scanning a storage phosphor storing a latent x-ray image with said laser beam in a raster pattern to produce an emitted light x-ray image;

photodetector means for converting said emitted light x-ray image into x-ray image signal;

amplifier means for amplifying said x-ray image signal, wherein said amplifier means has varying gain; and control means for controlling said laser beam scanning means to scan storage phosphors of different sizes with laser beam raster patterns of different sizes, wherein said control means includes means for detecting the size of said storage phosphor and for varying said gain of said amplifier means as a function of the detected storage phosphor size.

5. The storage phosphor apparatus of claim 4 wherein said scanning means includes mirror means for scanning said laser beam in a line scan direction across the width of said storage phosphor and means for moving said storage phosphor in a page scan direction past said scanning laser beam, and including means for feeding a storage phosphor to and from said moving means and wherein said detecting means detects the size of said storage phosphor as it is fed to said moving means.

6. The storage phosphor apparatus of claim 4 wherein said amplifier means includes an operational amplifier having a plurality of selectable gain setting resistors, only one of which is operable to set amplifier gain at a time, and wherein said control means selects one of said plurality of gain setting resistors as a function of the size of said storage phosphor detected by said detecting means.

* * * * *